United States Patent Office 3,647,583
Patented Mar. 7, 1972

3,647,583
METHOD OF MANUFACTURING A GLASS ARTICLE HAVING A LIGHT-DISPERSING LAYER
Hubertus Johannes De Rouw, Emmasingel, Eindhoven, Netherlands, assignor to U.S. Philips Corporation, New York, N.Y.
No Drawing. Filed Dec. 3, 1969, Ser. No. 881,877
Claims priority, application Netherlands, Dec. 10, 1968, 6817661
Int. Cl. C03c 15/02
U.S. Cl. 156—6                    1 Claim

ABSTRACT OF THE DISCLOSURE

The manufacture of a light-dispersing layer on the surface of BaO-containing glass, particularly the face plate of a television display tube by first polishing the surface with a polishing agent having a grain size of no more than $100\mu$ and by subsequently treating it with a solution containing between 25 and 50% by weight of HF and between 15 and 50% by weight of $HNO_3$

---

The invention relates to a method of manufacturing an article comprising BaO-containing silicate glass and being provided with a light-dispersing layer, particularly an image face plate of a cathode-ray tube for the display of television images. Furthermore the invention relates to an article obtained by such a method.

Such a light-dispersing layer is provided on the image side of a cathode-ray tube in order to reduce troublesome exterior reflections on the image face plate. However, the layer must not cause a large reduction of contrast, definition or luminance of the image.

The light-dispersing layer may alternatively be provided on a separate face plate the inner surface of which is equal to the outer surface of the image face plate of a cathode-ray tube. This face plate is secured to the cathode-ray tube such that the image face plate and an adjoining portion of the raised edge is embraced, the space between the face plate and the cathode-ray tube being filled with an adherent resin which is caused to harden completely, for example, an epoxy resin.

It has already been known to give the surface of a glass article light-dispersing properties, by roughening the glass surface first, and subsequently by slightly smoothing the obtained roughness profile by means of chemical polishing. Thus U.S. patent specification 2,670,279 proposes to first spray the glass surface for some time with a suspension of a pulverulent abrasive and to subsequently maintain it immersed in a solution of hydrofluoric acid.

During the experiments which led to the present invention it was found that this method used for BaO-containing silicate glass did not give rise to a satisfactory light-dispersing layer without taking a considerable loss of definition into the bargain. The conventional glasses for monochrome and colour television all contain BaO varying from approximately 8% to 20%.

According to the invention, the method of manufacturing an article comprising BaO-containing silicate glass and being provided with a light-dispersing layer by means of a roughening treatment succeeded by a treatment in a hydrofluoric acid-containing solution is characterized in that the glass surface is first ground with the aid of an abrasive having a grain size of no more than 100 microns, and that it is subsequently polished chemically with an aqueous solution containing between 25 and 50% by weight of HF and between 15 and 50% by weight of $HNO_3$ for such a long period that the surface reflects incident light in a diffuse manner.

Due to the treatment according to the invention a surface is obtained which shows a considerable reduction of reflection and nevertheless causes hardly any loss of definition. The surface quality obtained by this method and being characterized by a large number of shallow dimples per surface unit is apparently essential for the properties obtained.

An example of an article which is provided with a light-dispersing layer according to the invention is a face plate of a cathode-ray tube for colour television display, and comprises glass having the following composition in percent by weight:

| | |
|---|---|
| $SiO_2$ | 65.3 |
| $Li_2O$ | 0.5 |
| $Na_2O$ | 7.4 |
| $K_2O$ | 6.8 |
| $CaO$ | 3.9 |
| $BaO$ | 13.2 |
| $Al_2O_3$ | 2.4 |
| $Sb_2O_3$ | 0.3 |
| $CeO_2$ | 0.2 |

This face plate was first ground for 5 to 10 minutes on a metal base with the aid of carborundum powder having a grain size of less than 50 microns. Subsequently, this face plate was maintained immersed for 200 seconds in a mixture of equal volume parts of a HF solution of 75% and a $HNO_3$ solution of 70% at room temperature.

As a result the face plate obtained a surface having a light dispersion which is eminent for use in a television display tube without the definition being noticeably reduced as compared with an untreated face plate. The surface had a number of dimples of from 1000 to 1200 per sq. mm. The average depth of a dimple was 0.4 micron.

By varying the grain size of the abrasive within the imposed maximum grain size, the concentration of the polishing solution and the duration of the chemical polishing treatment it is possible to vary the nature of the light dispersion, interalia the scattering angle of an incident beam of light after reflection.

What is claimed is:
1. A method of manufacturing an article comprising a BaO-containing silicate glass and being provided with a light-dispersing layer particularly an image face plate of a cathode-ray tube for the display of television images comprising the steps of grinding the surface of the article with a dry abrasive powder having a grain size of no more than 100 microns, and subsequently chemically polishing said surface with an aqueous solution containing between 25 and 50% by weight of HF and between 15 and 50% by weight of $HNO_3$ for a time sufficient that the surface reflects incident light in a diffuse manner.

References Cited
UNITED STATES PATENTS

| 2,486,431 | 11/1949 | Nicoll et al. | 156—24 |
| 2,740,700 | 4/1965 | Fuller | 156—6 |
| 2,372,535 | 3/1945 | Walker | 156—24 X |
| 2,670,279 | 2/1954 | Szegho et al. | 156—6 |

JACOB H. STEINBERG, Primary Examiner

U.S. Cl. X.R.
65—31; 156—24